(12) United States Patent
Rapp et al.

(10) Patent No.: US 6,647,767 B1
(45) Date of Patent: Nov. 18, 2003

(54) APPARATUS FOR MEASURING THE MOVEMENTS OF AN AXLE HOUSING IN A VEHICLE DRIVE TRAIN SYSTEM

(75) Inventors: Jeremy A. Rapp, Toledo, OH (US); James E. Smith, Sylvania, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 92 days.

(21) Appl. No.: 10/060,938

(22) Filed: Jan. 30, 2002

(51) Int. Cl.[7] .............................................. G01M 13/02
(52) U.S. Cl. ...................................................... 73/118.1
(58) Field of Search .............................. 73/116, 117.2, 73/118.1, 119 R

(56) References Cited

U.S. PATENT DOCUMENTS

| | | |
|---|---|---|
| 3,049,003 A | 8/1962 | Felder |
| 3,572,106 A | 3/1971 | Jonas |
| 4,347,748 A | 9/1982 | Pierson |
| 4,689,990 A * | 9/1987 | Hofler et al. ............... 73/118.1 |
| 5,065,633 A | 11/1991 | Mercat |
| 5,265,467 A * | 11/1993 | Baer ......................... 73/118.1 |
| 5,285,691 A | 2/1994 | Baer |
| 5,417,109 A * | 5/1995 | Scourtes ...................... 73/116 |
| 5,760,302 A * | 6/1998 | Moradi et al. ................ 73/462 |

* cited by examiner

Primary Examiner—Eric S. McCall
(74) Attorney, Agent, or Firm—MacMillan, Sobanski & Todd, LLC

(57) ABSTRACT

An apparatus for measuring the movements of a component in a drive train assembly, such as an axle housing in a vehicular drive train assembly, includes a motion transfer member having a first end that is connected to the axle assembly for movement therewith. A second end of the motion transfer member extends from the axle assembly into engagement with a measuring device that is supported co-axially with or relative to the axle assembly. The measuring device is responsive to the movements of the axle assembly for generating a signal that is representative thereof. The electrical signals generated by the measuring device are fed to an electronic controller for storage and/or analysis.

12 Claims, 4 Drawing Sheets

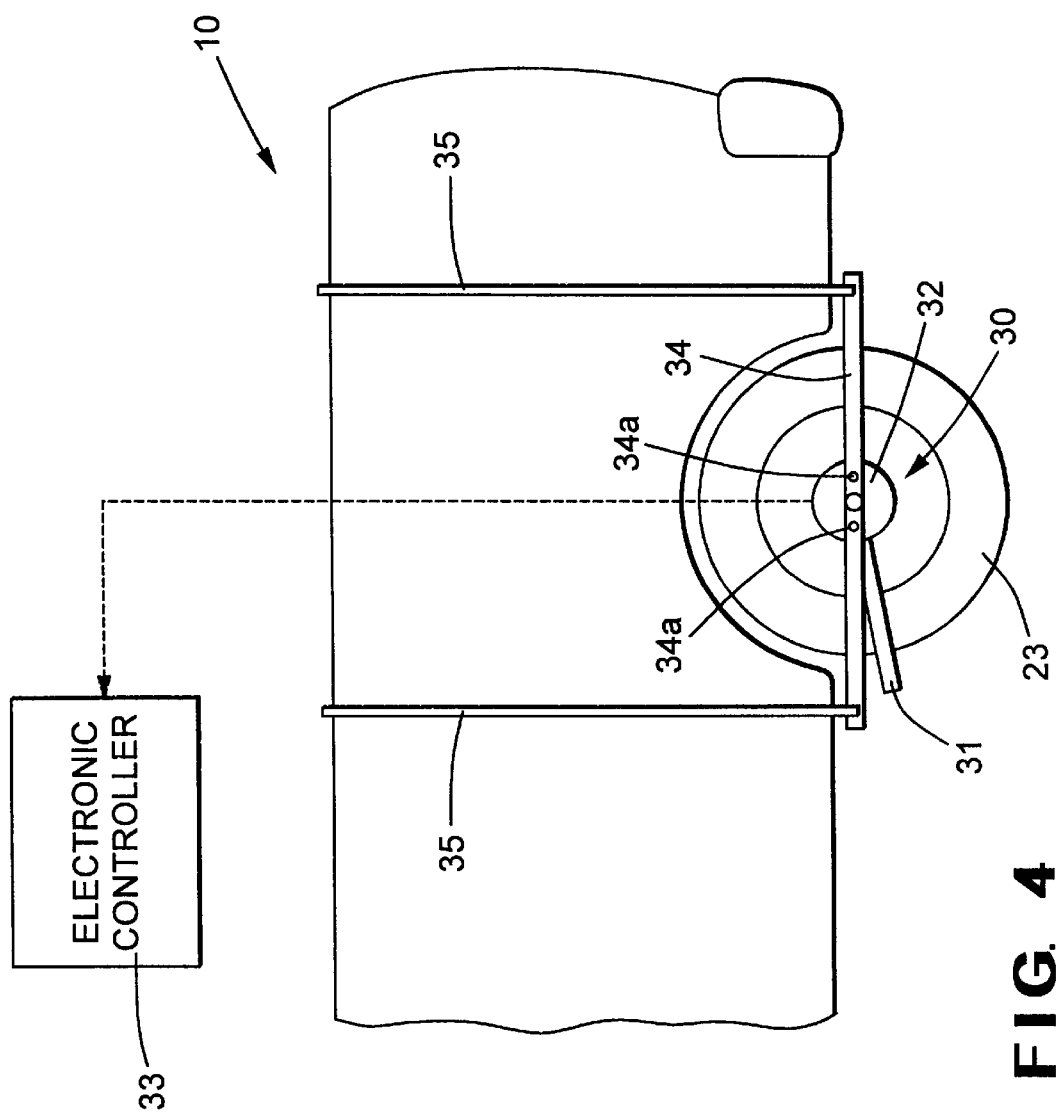

APPARATUS FOR MEASURING THE MOVEMENTS OF AN AXLE HOUSING IN A VEHICLE DRIVE TRAIN SYSTEM

BACKGROUND OF THE INVENTION

This invention relates in general to a device for measuring the movements of a component in a drive train system that generates power from a source and transfers such power from the source to a driven mechanism. In particular, this invention relates to an apparatus for measuring the movements of an axle housing in a vehicular drive train system during operation.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a hollow cylindrical driveshaft tube to an input shaft of an axle assembly so as to rotatably drive the wheels of the vehicle. To accomplish this, a first universal joint is usually connected between the output shaft of the engine/transmission assembly and a first end of the driveshaft tube, while a second universal joint is usually connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

The various components of these vehicular and other drive train systems are usually supported on or connected to a frame assembly or other rigid support structure so as to be generally fixed in position relative to one another during use. However, in many instances, the drive train system may be designed to accommodate limited amount of movement of one or more of the components of the drive train system relative to the others. For example, in a commonly known vehicular drive train system, the engine/transmission assembly is secured to the vehicle frame assembly so as to be essentially immovable relative thereto, while the axle assembly is resiliently connected to the vehicle frame assembly for movement relative thereto, such as when bumps in the road are encountered. Thus, the axle assembly is permitted to move a limited amount relative to the engine/transmission assembly under normal operating conditions.

Furthermore, it is known other relative movements of the drive train system to components can occur under certain operating conditions. For example, when relatively large torsional loads are transmitted through a vehicular drive train system from the engine/transmission assembly to the axle assembly, such as can occur during rapid acceleration of the vehicle, the axle assembly may pitch or rotate slightly relative to the remainder of the vehicle. Similar pitching or rotating movements of the axle is assembly can occur during relatively rapid deceleration of the vehicle, such as when the brakes of the vehicle are applied). These and other dynamic movements of the axle assembly relative to the remainder of the vehicular drive train system can, if sufficiently large in magnitude, result in undesirable operating conditions. For example, the above-described relative movements of the axle assembly can result in undesirable tension and compression of the driveshaft tube, and can also cause the operating angles of the universal joints to become undesirably large.

Most vehicular drive train systems are designed to accommodate a certain amount of such relative movements. For example, a slip joint may be provided in the drive train system to prevent excessive tension and compression of the driveshaft tube that might otherwise result from such relative movements. However, it is known that the magnitudes of such relative movements can vary widely from vehicle model to vehicle model as a result of a variety of factors, such as suspension characteristics, vehicle weight, and the like. To insure that the drive train system is always operated within predetermined design parameters, it would be desirable to provide an apparatus that is capable of measuring the movements of a component in a drive train assembly, such as an axle housing in a vehicular drive train assembly, for subsequent evaluation.

SUMMARY OF THE INVENTION

This invention relates to an apparatus for measuring the movements of a component in a drive train assembly, such as an axle housing in a vehicular drive train assembly. The apparatus includes a motion transfer member having a first end that is connected to the axle assembly for movement therewith. A second end of the motion transfer member extends from the axle assembly into engagement with a measuring device that is supported co-axially with or relative to the axle assembly. The measuring device is responsive to the movements of the axle assembly for generating a signal that is representative thereof. The electrical signals generated by the measuring device are fed to an electronic controller for storage and/or analysis.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a side elevational view of portions of the vehicle and the apparatus for the movements of the component of the drive train system illustrated in FIG. 1.

DETAILED DESCRIPTION OF THE PREFERRED EMBODIMENT

Figure 1:
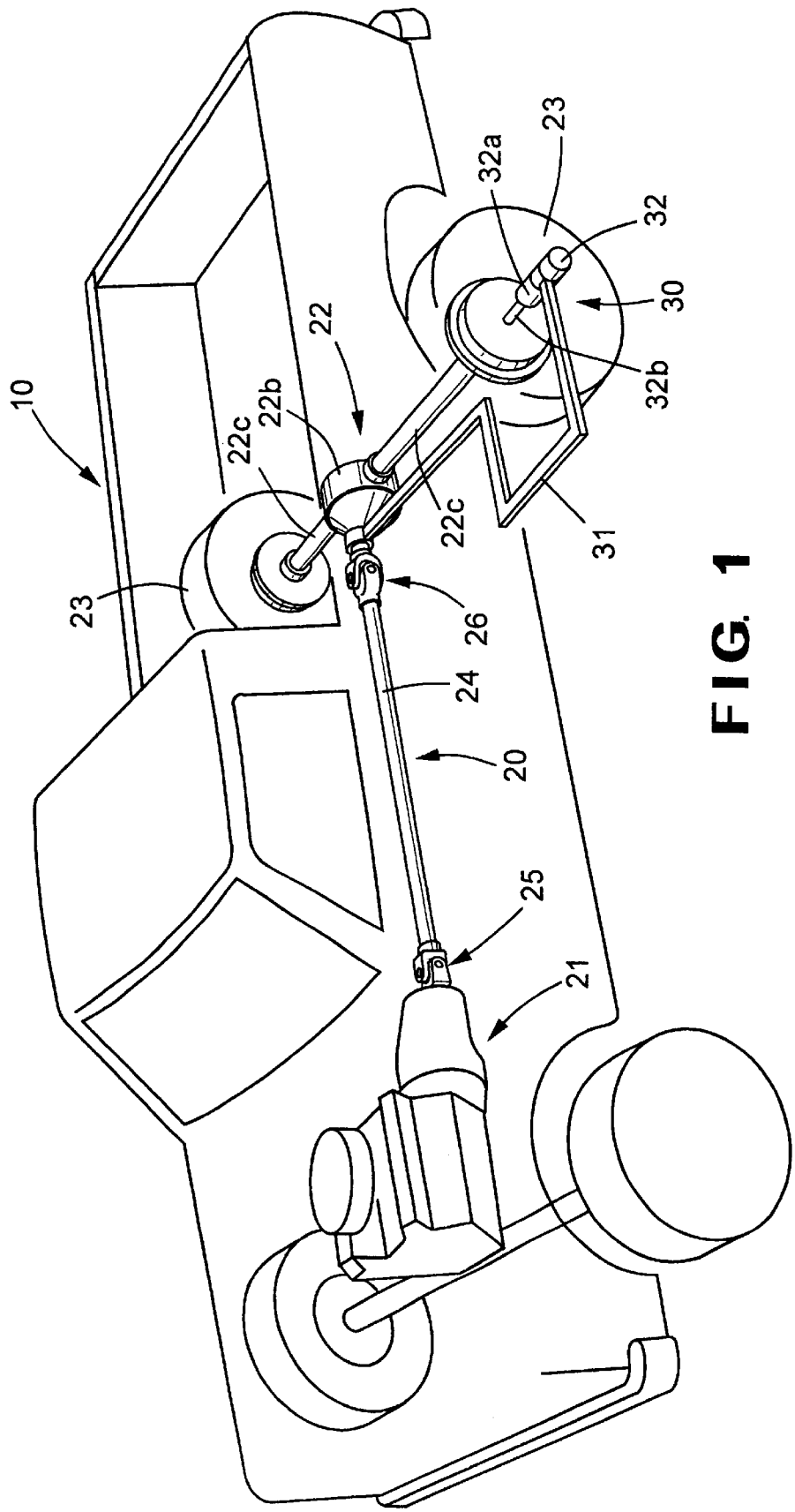
FIG. 1 is a schematic perspective view of a vehicular drive train system including an apparatus for measuring the movements one of the components therein in accordance with this invention.

Referring now to the drawings, there is schematically illustrated in FIG. 1 a portion of a vehicle, indicated generally at 10, that includes a conventional drive train system, indicated generally at 20. Although this invention will be described and illustrated in the context of the rotational drive train system 20 for causing movement of the illustrated vehicle 10, it will be appreciated that this invention may be practiced in conjunction with any type of drive train system for transferring power from a source of power to a driven mechanism, regardless of whether it is provided in a vehicle or whether it transmits rotational power from the source to the driven mechanism.

The illustrated vehicular drive train system 20 is provided for transmitting rotational power from an output shaft (not shown) of an engine/transmission assembly, indicated generally at 21, to an input shaft 22a (see FIGS. 2 and 3) of an axle assembly, indicated generally at 22, so as to rotatably drive one or more wheels 23 of the vehicle. To accomplish this, the illustrated drive train system 20 includes a hollow cylindrical driveshaft tube 24. A first universal joint, indicated generally at 25, is connected between the output shaft of the engine/transmission assembly 21 and a first end of the driveshaft tube 24. Similarly, a second universal joint, indicated generally at 26, is connected between a second end of the driveshaft tube 24 and the input shaft 22a of the axle assembly 22. The universal joints 25 and 26 provide a rotational driving connection from the output shaft of the engine/transmission assembly 21 through the driveshaft tube 24 to the input shaft 22a of the axle assembly 22, while accommodating a limited amount of misalignment between the rotational axes of these three shafts.

The axle assembly 22 is also conventional in the art, having a hollow housing that includes a central hollow carrier 22b and a pair of hollow axle tubes 22c that extend laterally from the central carrier 22a to the respective driven wheels 23. The central carrier 22b supports and protectively encloses a conventional differential gear mechanism (not shown), while the axle tubes 22c support and protectively enclose respective axle driveshafts (not shown). In a manner that is well known in the art, rotation of the input shaft 22a of the axle assembly 22 causes rotation of the differential gear mechanism supported within the central carrier 22b. Rotation of the differential gear mechanism causes corresponding rotation of the two axle driveshafts supported within the axle tubes 22c and, therefore, rotation of the associated wheels 23. Consequently, operation of the engine/transmission assembly 21 causes rotation of the wheels 23 and, therefore, movement of the vehicle.

The engine/transmission assembly 21 is typically secured to a frame assembly not shown) of the vehicle 10 or other support structure so as to be essentially immovable relative thereto. However, the axle assembly 22 is typically resiliently connected to the frame assembly of the vehicle 10 for movement relative thereto. This resilient connection is often provided in the form of leaf springs or similar resilient mechanical structures extending between the frame assembly of the vehicle 10 and the axle housing 22. This resilient connection is provided to minimize the effects of bumps or obstructions in the road that may be encountered during operation of the vehicle 10. Thus, the drive train assembly 20 is usually designed to accommodate a limited amount of relative movement between the engine/transmission assembly 21 and the axle assembly 22 during normal use.

Furthermore, other relative movements of the engine/transmission assembly 21 and the axle assembly 22 can occur when the vehicle 10 is operated under certain operating conditions. For example, when relatively large torsional loads are transmitted through the drive train system from the engine/transmission assembly 21 to the axle assembly 22, such as can occur during rapid acceleration of the vehicle 10, the axle assembly 22 may pitch or rotate slightly relative to the remainder of the vehicle 10. Similar dynamic movements of the axle assembly 22 can occur during relatively rapid deceleration of the vehicle 10, such as when the brakes of the vehicle 10 are applied.

Figure 2:
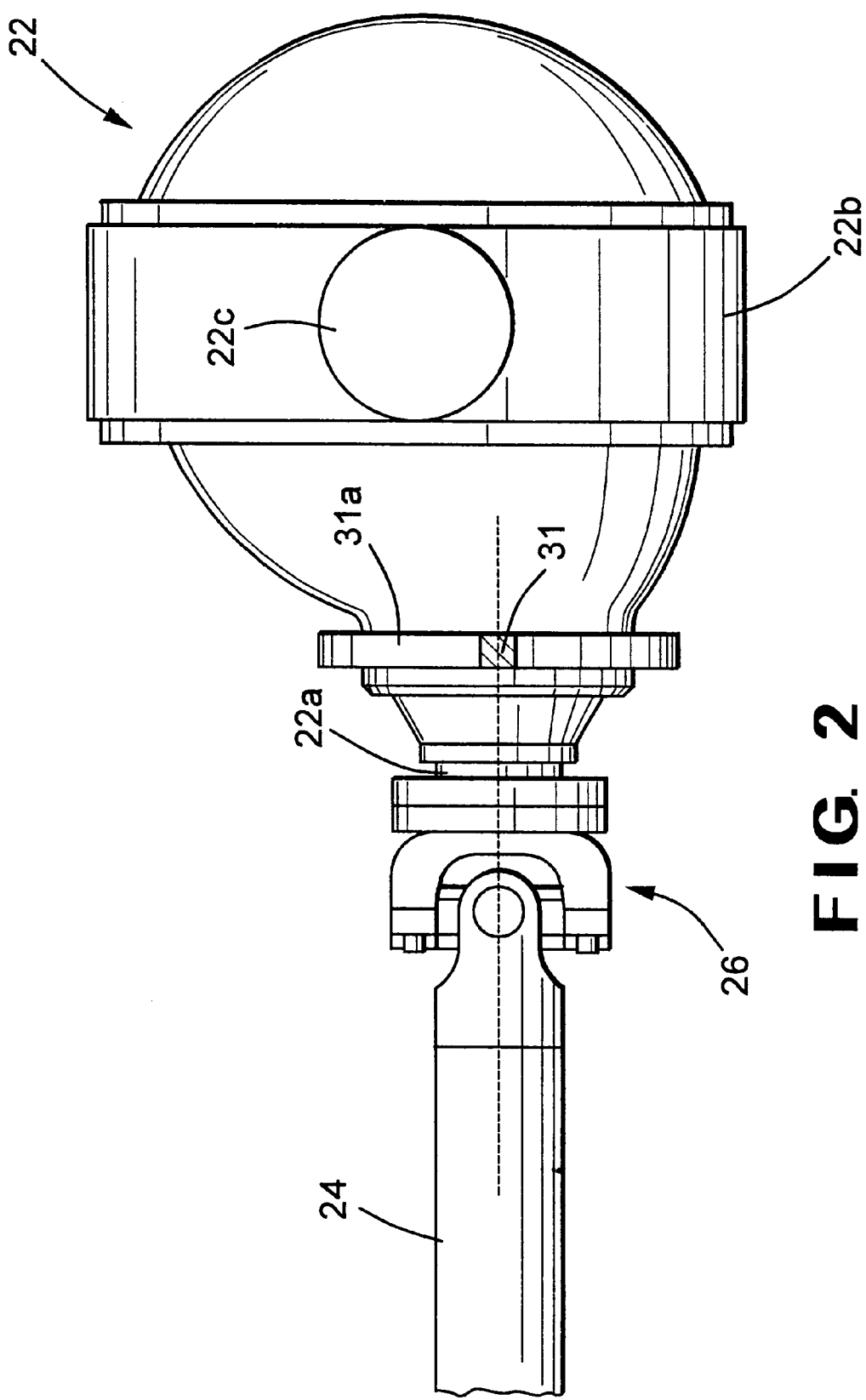
FIG. 2 is a side elevational view, partially in cross section, of portions of the vehicular drive train system and the apparatus for measuring the movements of the component illustrated in FIG. 1, wherein the illustrated portion of the vehicular drive train system is shown in a first operating condition.
Figure 3:
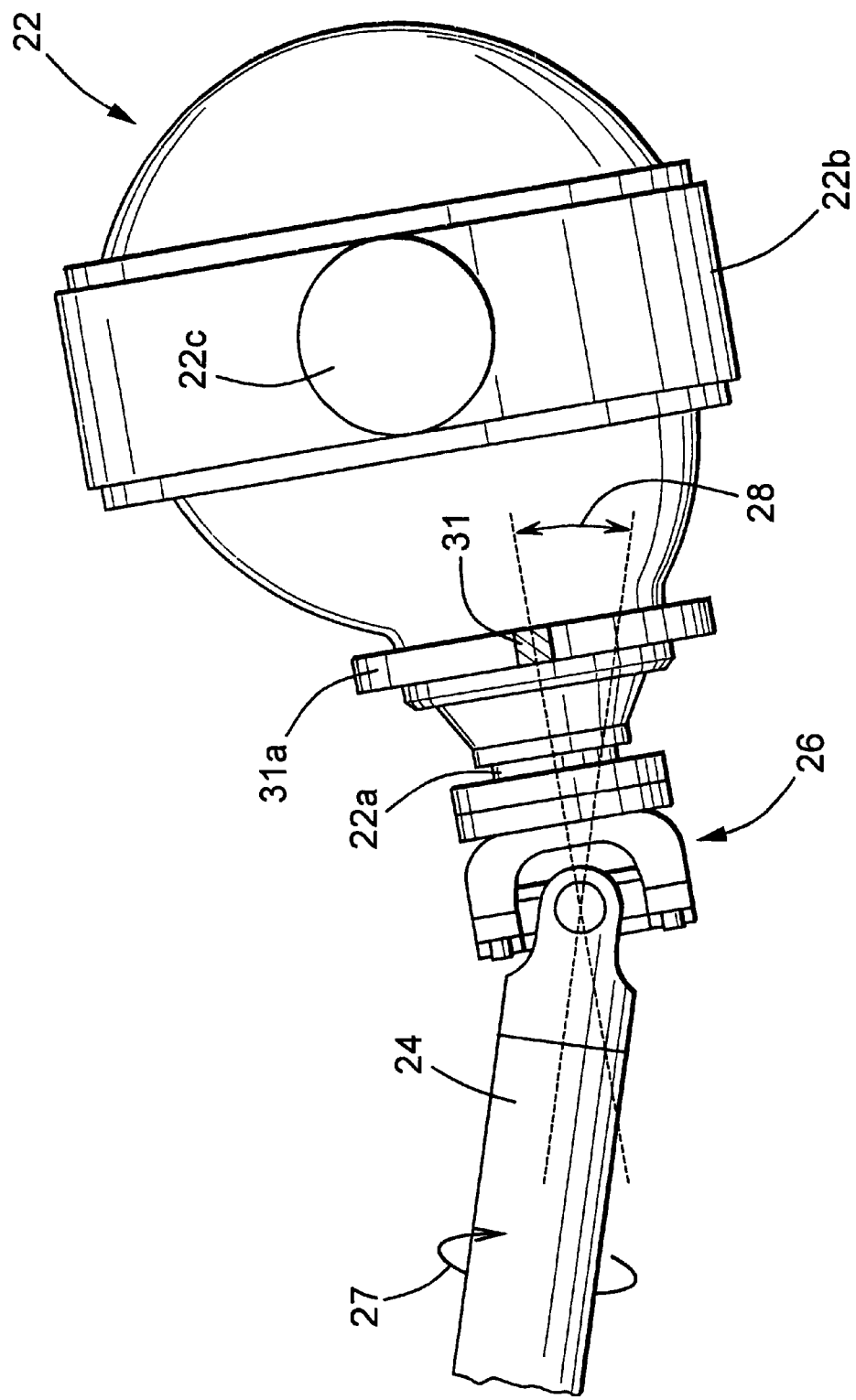
FIG. 3 is a side elevational view similar to FIG. 2, wherein the illustrated portion of the vehicular drive train system is shown in a second operating condition.

FIGS. 2 and 3 illustrate first and second operating conditions of the drive train assembly 20 that can occur as a result of some or all of the above-discussed conditions. In the first operating condition illustrated in FIG. 2, the driveshaft tube 24 is not rotated by the engine/transmission assembly 21. As a result of this non-rotation, and further in view of a variety of other factors, such as suspension characteristics, vehicle weight, and the like, the rotational axes of the driveshaft tube 24 and the input shaft 22a of the axle assembly 22 are essentially co-axially aligned with one another. In the second operating condition illustrated in FIG. 3, the driveshaft tube 24 is rotated by the engine/transmission assembly, as indicated by the arrow 27. Because of the inertia, the vehicle 10 initially resists movement caused by rotation of the driveshaft tube 24. Consequently, the rotation of the driveshaft tube 24 initially generates torsional loads within the axle assembly 22. Such torsional loads can cause the axle assembly 22 to pitch or rotate slightly relative to the remainder of the drive train assembly 20 and the vehicle 10. As shown in FIG. 3, this relative movement of axle assembly causes the rotational axes of the driveshaft tube 24 and the input shaft of the axle assembly 22 to be disposed at an angle (somewhat exaggerated for the purpose of illustration) indicated by the arrow 28. It should be appreciated that the first and second operating conditions shown in FIGS. 2 and 3 are intended merely to be illustrative of any relative movement or orientation of any of the components in the drive train assembly 20.

In order to measure the amounts of such movements of the axle assembly 22, an apparatus, indicated generally at 30, is provided in accordance with this invention. The apparatus 30 includes a motion transfer member 31 having a first end that is connected to the axle assembly 22 for movement therewith. In the illustrated embodiment, the motion transfer member 31 is embodied as a single rigid bar having a plurality of bends formed therein for a purpose that will be described below. However, the motion connection member 31 may be embodied as a plurality of members that are connected together in a linkage or in any other manner for movement with the axle assembly 22. As shown in FIGS. 2 and 3, the first end of the motion transfer member 31 includes an annular connection portion 31a that extends about and is connected to a portion of the central carrier 22b of the axle assembly 22. The connection portion 31a of the motion transfer member 31 is preferably connected to the axle assembly 22 in a temporary or relatively easily removable manner, such as by clamps or threaded fasteners. However, the connection portion 31a of the motion transfer member 31 may be connected to the axle assembly 22 in any desired manner, including using permanent or semi-permanent procedures such as welding or adhesives.

The second end of the motion transfer member 31 extends from the axle assembly 22 into engagement with a measuring device 32. In the illustrated embodiment, the measuring device 32 is supported co-axially (in a manner that is described in detail below) with or relative to the axle assembly 22 on the outside of one of the wheels 23 of the vehicle 10. To accomplish this, the motion transfer member 31 is formed having a U-shaped portion that allows it to extend around such wheel 23 of the vehicle 10 into engagement with the measuring device 32, as shown in FIG. 1. However, the measuring device 32 may be mounted at any desired location on the vehicle 10.

The measuring device 32 can be embodied as any device that is responsive to the movements of the axle assembly 22

(as represented by the movement of the motion transfer member 31) for generating a signal that is representative thereof. For example, the measuring device 32 may be embodied as a conventional radial or rotary voltage displacement transducer having a fixed portion and a movable portion. The fixed portion of the transducer 32 is preferably supported (in the manner described below) co-axially on or relative to the axle assembly 22 in such a manner as to not pitch or rotate therewith during operation of the vehicle 10, such as discussed above and illustrated in FIGS. 2 and 3. The movable portion of the transducer 32 is connected to the motion transfer member 31 for movement therewith. Thus, when the axle assembly 22 experiences movements of the type illustrated in FIGS. 2 and 3, the movable portion of the transducer 32 is moved relative to the fixed portion thereof. As a result, the transducer 32 generates an electrical signal that is representative of such movement of the axle assembly. The electrical signal generated by the transducer 32 can be fed to an electronic controller 33 (see FIG. 4) or any other conventional device for storage and/or analysis in any desired manner.

As mentioned above, the fixed portion of the transducer 32 is preferably supported co-axially on the axle assembly 22 in such a manner as to not pitch or rotate therewith during operation of the vehicle 10. To accomplish this, the transducer 32 can be supported on a roller bearing 32a or similar structure that, in turn, is supported on an extension shaft 32a connected to the wheel 23 of the vehicle 10. The roller bearing 32a includes an outer race that is connected to the transducer 32, an inner race that is connected to the extension shaft 32b, and a plurality of rolling elements that support the inner race for rotation relative to the outer race. Thus, even when the wheel 23 is rotated during operation of the vehicle 10, the transducer 32 is supported co-axially with the axle assembly 22 in a non-rotatable manner.

To insure that the transducer 32 remains stationary during operation of the vehicle 10, a stabilizing arm 34 (see FIG. 4) can be connected between it and a portion of the vehicle 10. The stabilizing arm 34 can be secured to the transducer 32 by any conventional means, such as by a pair of threaded fasteners 34a. The ends of the stabilizing bar 34 can then be connected to one or portions of the vehicle 10, such as by a pair of resilient straps 35 or other structures. The straps 35 maintain the stabilizing bar 34 (and, therefore, the transducer 32) in a fixed position relative to the vehicle 10, even when the wheel 23 of the vehicle 10 is rotated during use.

Thus, during operation of the vehicle 10, the movements of the axle assembly 22 are sensed by the measuring device 32. The magnitudes of such movements are reflected in the electrical signals that are generated by the measuring device 32 to the electronic controller 33 for storage and/or analysis in any desired manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive train system comprising:
   a drive train system that generates power from a source and transfers such power from said source to a driven mechanism; and
   an apparatus for measuring the movements of said as said drive train system is operated, said apparatus including a motion transfer member including a first end and a second end, said first end connected to said driven mechanism such that said second end moves in accordance with the movements of said driven mechanism, and a measurement device that is responsive to movement of said second end of said motion transfer member for generating a signal that is representative of such movement.

2. The drive train system defined in claim 1 wherein said motion transfer member includes a connection portion that is adapted to that extend about and be connected to a portion of said component.

3. The drive train system defined in claim 1 wherein said measurement device is a radial voltage displacement transducer having a fixed portion that is maintained in position relative to said component and a movable portion that is connected to said second end of said motion transfer member.

4. The drive train system defined in claim 3 further including a stabilizing bar that is secured to said fixed portion of said radial voltage displacement transducer to maintain it in position relative to said component.

5. A vehicular drive train system comprising:
   an engine including an output shaft;
   an axle assembly including an input shaft;
   a driveshaft connected between said output shaft of said engine and said input shaft of said axle assembly; and
   an apparatus for measuring the movements of said axle assembly as said vehicular drive train system is operated, said apparatus including a motion transfer member including a first end and a second end, said first end adapted to be connected to said axle assembly such that said second end moves in accordance with the movements of said axle assembly, and a measurement device that is responsive to movement of said second end of said motion transfer member for generating a signal that is representative of such movement.

6. The vehicular drive train system defined in claim 5 wherein said motion transfer member includes a connection portion that is adapted to that extend about and be connected to a portion of said axle assembly.

7. The vehicular drive train system defined in claim 5 wherein said measurement device is a radial voltage displacement transducer having a fixed portion that is maintained in position relative to said axle assembly and a movable portion that is connected to said second end of said motion transfer member.

8. The vehicular drive train system defined in claim 7 further including a stabilizing bar that is secured to said fixed portion of said radial voltage displacement transducer to maintain it in position relative to said axle assembly.

9. The vehicular drive train system defined in claim 5 wherein said measurement device is supported co-axially with or relative to said axle assembly.

10. The vehicular drive train system defined in claim 5 wherein said axle assembly rotatably drives a wheel, and wherein said measurement device is supported on said wheel.

11. The vehicular drive train system defined in claim 10 further including a bearing for rotatably supporting said measurement device on said wheel.

12. The vehicular drive train system defined in claim 10 further including a extension bar that is connected to said wheel for rotation therewith and a bearing for rotatably supporting said measurement device on said extension bar.

* * * * *

UNITED STATES PATENT AND TRADEMARK OFFICE
CERTIFICATE OF CORRECTION

PATENT NO.   : 6,647,767 B1
DATED        : November 18, 2003
INVENTOR(S)  : Jeremy A. Rapp et al.

It is certified that error appears in the above-identified patent and that said Letters Patent is hereby corrected as shown below:

<u>Column 5,</u>
Line 65, insert the words -- driven mechanism -- before "as said"

<u>Column 6,</u>
Line 32, delete the words "adapted to be"

Signed and Sealed this

Ninth Day of March, 2004

JON W. DUDAS
*Acting Director of the United States Patent and Trademark Office*